No. 752,280. PATENTED FEB. 16, 1904.
E. BECKWITH.
EYEGLASSES.
APPLICATION FILED JULY 2, 1902.
NO MODEL.

Witnesses
Charles Hanimann
Fred. C. Hauford

Edwin Beckwith
Inventor
By Walter S. Logan
Attorney

No. 752,280.

Patented February 16, 1904.

UNITED STATES PATENT OFFICE.

EDWIN BECKWITH, OF NEW YORK, N. Y.

EYEGLASSES.

SPECIFICATION forming part of Letters Patent No. 752,280, dated February 16, 1904.

Application filed July 2, 1902. Serial No. 114,156. (No model.)

*To all whom it may concern:*

Be it known that I, EDWIN BECKWITH, a citizen of the United States, residing in the city of New York, in the county and State of New York, have invented a certain new and useful Improvement in Eyeglasses; and I do hereby declare the following to be a full, clear, and exact description of the invention, such as will enable others skilled in the art to which it appertains to make and use the same.

This invention relates to eyeglasses, and has special reference to the spring attached to a post at either end which connects the two lenses.

In eyeglasses as formerly made and in general use much inconvenience is experienced by the user because of the tendency of the spring to become weakened, to be insecurely adjusted to the nose, not remaining in its fixed or desired position upon the nose, being unable to adjust itself to the nose with more than one spring action, requiring frequent adjustments for the desired position of the eyeglasses upon the nose.

It is the object of the invention to construct the spring so that in combination with the lenses, nose-guards, posts, or studs an action is effected which brings into use all of the known spring movement whether horizontal, perpendicular, oblique, angular, outward or inward, upward or downward, or any known motions or actions upon any given plane. These various actions of the spring will prevent the eyeglasses from tipping forward or backward, will enable the glasses to be adjusted to the peculiar formation or size of the nose of any person, and will enable the glass to be always secure to the nose and set on a horizontal plane with the eyes.

Devices embodying my improvement are represented in the accompanying drawings, as hereinafter described and claimed.

Figure 1:
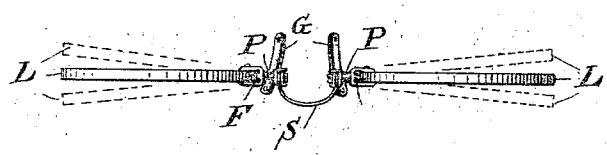
Figure 2:
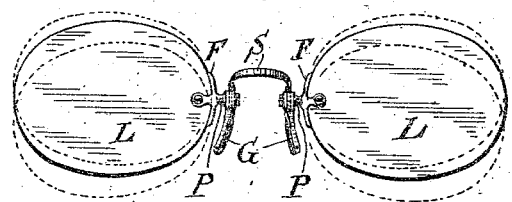
Figure 3:
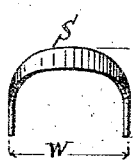
Figure 4:
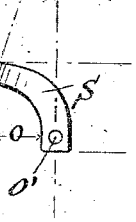
Figures 5, 6:
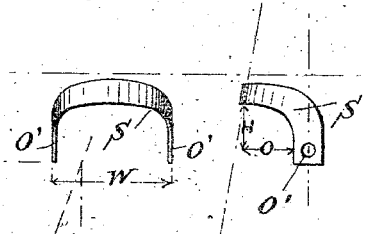
Figure 7:
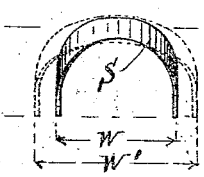
Figure 8:
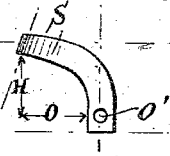

Figure 1 is a side elevation of my eyeglasses, having the improved form of spring. The dotted lines show one of the planes of action—the horizontal. Fig. 2 is a front elevation of my glasses having the new form of spring. The dotted lines in this figure show another plane of action—the perpendicular. Fig. 3 shows a front elevation of one form of my new spring detached. Fig. 4 shows a side elevation. Fig. 5 shows a front elevation of my new spring, but having a different angle than Fig. 3. Fig. 6 is a side elevation of the spring, as shown in Fig. 5. Fig. 7 shows another angle of my spring and the dotted lines show different widths. Fig. 8 shows the side elevation of the spring, as shown in Fig. 7.

In the drawings, L represents the lenses attached by screws to the post P. Post P has flanges extending part way along the end of the lens L. Onto the opposite ends of the post P are attached the nose-guards G in the usual manner.

The spring S, as shown in Figs. 3 and 4 and in Figs. 1 and 2 in combination, is made so that an elastic action thereof may be exerted in any direction. This is accomplished by curving the top and center outward, forward, and upward, thinning and narrowing the metal at the center, so that it will act at that point like a pivot, enabling the eyeglasses to move horizontally, perpendicularly, obliquely, angularly, or in any conceivable direction or plane. This spring has its thinnest point at the center, the walls thereof being gradually thickened and widened, so that the ends, which are attached to the posts, are practically rigid and unyielding. The ends of the spring have an opening O, through which screws pass, enabling the spring to be securely attached to the post F and guard G. By diffusing the grip of the spring by constructing it as above described, so that there is an equal pressure in every direction, the nose-guards will conform to any slight unevenness of the nose, and thus prevent the pressure of the spring from irritating the cuticle or exerting more pressure at one point than another, as in the old devices. In making my spring so that it will flex in any known direction the glasses may be spread from the bottom upward when being adjusted to the nose or by the backward motion or an angular motion or an oblique motion. Any or all of these motions can be exerted coördinately.

I do not desire to confine myself to any particular angular shape. I have shown three different angles in the drawings. Many different angles may be used and still embody my invention. Neither do I desire to be confined to any particular length of spring, as it is apparent that my invention is equally applicable to a long or a short spring.

5. I prefer gold as a material for use in my spring; but steel or any other suitable elastic material may be used. It is evident that by using less material and so shaping it that the most exposed part of the spring is thin the spring becomes practically invisible, which is one of the objects desired and is an advantage which I claim for my spring.

Having thus described my invention, I claim and desire to secure by Letters Patent—

In eyeglasses the combination of a pair of lenses attached to clamping-posts, provided with nose-guards and an elastic angular spring made narrow and thin in the center with gradually widened and thickened walls toward the ends, whereby the eyeglasses may move angularly in every direction, substantially as described.

In testimony that I claim the foregoing as my invention I have hereunto signed my name this 1st day of July, A. D. 1902.

EDWIN BECKWITH.

In presence of—
FRED C. HANFORD,
RUSSELL G. LUCAS.